United States Patent
Varghese et al.

(10) Patent No.: US 12,481,437 B1
(45) Date of Patent: Nov. 25, 2025

(54) CONNECTING AND DISCONNECTING A COMMUNICATION LINK BETWEEN AN END NODE AND DISCOVERY CONTROLLER IN A NON-VOLATILE MEMORY EXPRESS ENVIRONMENT

(71) Applicant: DELL PRODUCTS L.P., Round Rock, TX (US)

(72) Inventors: Vibin Varghese, Chennai (IN); Sathish Kumar Janakiraman, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 26 days.

(21) Appl. No.: 18/674,740

(22) Filed: May 24, 2024

(51) Int. Cl.
  *G06F 3/00* (2006.01)
  *G06F 3/06* (2006.01)

(52) U.S. Cl.
  CPC .......... *G06F 3/0629* (2013.01); *G06F 3/0604* (2013.01); *G06F 3/067* (2013.01); *G06F 3/0679* (2013.01)

(58) Field of Classification Search
  CPC ...... G06F 3/0629; G06F 3/0604; G06F 3/067; G06F 3/0679
  See application file for complete search history.

(56) References Cited

U.S. PATENT DOCUMENTS

| 2016/0315964 A1* | 10/2016 | Shetty ................... H04L 63/168 |
| 2021/0064281 A1* | 3/2021 | Satapathy ............. G06F 3/0679 |
| 2023/0342059 A1* | 10/2023 | Mayraz Matosevich .................... G06F 3/0659 |

OTHER PUBLICATIONS

"TCG EFI Platform Specification For TPM Family 1.1 or 1.2," Specification Version 1.22, Revision 15, TCG Published, Jan. 2014. (43pgs).

* cited by examiner

*Primary Examiner* — Craig S Goldschmidt
(74) *Attorney, Agent, or Firm* — BAUGH LAW, LLC (57) ABSTRACT

To more effectively and efficiently use connections in a Non-Volatile Memory Express (NVMe) environment, embodiments allow an end node to disconnect from a discovery controller (DC). For example, after an initial connection duration, the end node may disconnect from the DC. Once the end node disconnects, the DC may change the end node's status to an "INACTIVE" state. In one or more embodiments, the end node's status change from "ACTIVE" to "INACTIVE" does not trigger a notification to be sent to any end node interacting or related to that end node. Embodiments may also include one or more reconnecting processes such as a keep alive check and/or to communicate updates/changes. Additionally, or alternatively, a reconnection process (e.g., a kickstart process) may be initiated by the DC or the end node to cause the end node to reconnect so that updated/changed information may be shared with the end node.

20 Claims, 8 Drawing Sheets

CONNECTING AND DISCONNECTING A COMMUNICATION LINK BETWEEN AN END NODE AND DISCOVERY CONTROLLER IN A NON-VOLATILE MEMORY EXPRESS ENVIRONMENT

BACKGROUND

A. Technical Field

The present disclosure relates generally to information handling systems. More particularly, the present disclosure relates to connections in storage area network environments.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In deployments involving non-volatile memory over express (NVMe) over transmission control protocol (TCP) (NVMe-over-TCP or NVMe/TCP) that utilize a discovery controller—which may be a direct discovery controller (DDC) of a storage subsystem (or storage array) or a centralized discovery controller (CDC)—the end nodes, such as hosts and storage subsystems, connect with the DC. This connection may be used to facilitate registering the end node properties with the discovery controller and in obtaining information (e.g., in receiving log page details).

After receiving information from the DC, such as zoning information, authorized end nodes establish a connection. For example, a host establishes a connection with a storage subsystem to which it has been zoned and may use that connection for I/O (input/output) operations.

Even after a host establishes a connection directly with a storage subsystem, the initial TCP connection between an end node and the discovery controller (DC) (e.g., DDC or CDC) is maintained. The connection between the DC and an end node is maintained so that notifications (e.g., asynchronous event notifications (AENs)) and information exchanges (e.g., log pages) may be communicated. However, maintaining such a connection is costly. Besides requiring a network link connection, there are other overhead costs that are incurred, such as handling frequent "keep alive" messages, which are used to gauge whether the connection is still active.

Accordingly, it is highly desirable to find new ways to establish connections between an NVMe endpoint and a discovery controller.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) a time duration has been reached.

It shall also be noted that although embodiments described herein may be within the context of storage area networks that utilize NVMe, aspects of the present disclosure are not so limited. Accordingly, the aspects of the present disclosure may be applied or adapted for use in other contexts.

A. General Introduction

One common use of information handling systems is in data storage systems. One example of a storage network is an NVMe storage system. An NVMe storage system uses Non-Volatile Memory Express® (NVMe®) technology, which is specifically designed to leverage the performance benefits of solid-state drives (SSDs). These SSDs are significantly faster than traditional hard disk drives (HDDs) and even older SSDs. Multiple SSDs may be combined in arrays or clustered configurations to meet the demands of large-scale storage deployments, cloud environments, and data-intensive applications.

In storage area networks (SANs), a host interacts with a storage subsystem, which may be an SSD or set of SSDs. A SAN implementation may use NVMe over Fabrics (NVMe-oF), which extends the benefits of NVMe technology across a network, allowing remote access to NVMe storage devices with low latency and high throughput. This enables the creation of distributed storage architectures and facilitates the integration of NVMe storage systems into existing data center infrastructures.

Some storage deployments may use NVMe/TCP (NVMe over TCP), which is a technology that allows NVMe storage devices to be accessed remotely over a network using the TCP/IP (Transmission Control Protocol/Internet Protocol) suite. It extends the NVMe protocol to operate over standard Ethernet networks, leveraging the widely adopted TCP/IP stack for communication.

NVMe/TCP is designed to provide a more accessible and cost-effective alternative to traditional NVMe-over-Fabrics (NVMe-oF) solutions, which often require specialized network fabrics and infrastructure. By using TCP/IP, NVMe/TCP can be deployed on existing Ethernet networks without the need for additional hardware or significant network upgrades.

Overall, NVMe/TCP provides a flexible and accessible way to extend the benefits of NVMe storage to remote access scenarios over standard Ethernet networks, offering a balance between performance, cost, and compatibility with existing infrastructure. However, it is not without its issues.

Deployments that use NVMe over TCP involve establishing a TCP connection between an end node (or endpoint) (e.g., a host or a storage subsystem) and a discovery controller, which may be a centralized discovery controller (CDC) or other type of discovery controller. This connection may be used to facilitate registering the end node properties with the DC and may also be used for obtaining information (e.g., to receive information via one or more log pages).

After receiving information from the DC, such as zoning information, authorized end nodes establish a connection with authorized end node(s). For example, a host connects to a storage subsystem directly and may perform I/O (input/output) operations via that connection.

Even after a host establishes a connection directly with a storage subsystem, the initial TCP connection between an end node and the discovery controller (DDC or CDC) is maintained. The connection between the DC and an end node is maintained so that notifications (e.g., asynchronous event notifications (AENs)) and information exchanges (e.g., log pages) may be communicated. However, maintaining such a connection is costly.

Besides requiring a network link connection, there are overhead costs that are incurred, such as handling frequent "keep alive" messages, which are used to gauge whether the connection is still active.

Also, there are a limited number of end nodes/connections that may be supported. Therefore, maintaining a connection that is not being effectively or efficiently utilized is costly and limiting.

Furthermore, deployments where I/O is going to be used via another protocol (e.g., RDMA (remote direct memory access)/ROCE (RDMA over Converged Ethernet)), the TCP connection to the DC is woefully underutilized because it is used only for registration-related processes and for updates (e.g., AEN-Get_Log_Page Request-Get_Log_Page Response interactions). For example, a command such as DIM-TRTYPE-ROCE (Discovery Information Management Transport Type over RDMA over Converged Ethernet) may be used in NVMe to manage discovery information for NVMe controllers and subsystems. Specifically, the DIM command is used for performing two types of tasks: register or deregister. Registration involves the adding of an end node (or endpoint) to a CDC database. During registration, the host provides information such as its NON (NVMe Qualified Name), ID, hostname, operating system version, etc. Deregister involves the removal (or changing of status) of an endpoint in the CDC's database. The CDC maintains one or more database (or data stores) of hosts and storage subsystems in a network.

Each of these issues discussed above illustrates that the maintaining a TCP connection between the end node and the DC is sub-optimal. Accordingly, embodiments herein seek to avoid maintaining or at least improve the efficient use of a TCP connection between an end node and a DC (i.e., DDC or CDC).

B. System Embodiments and Method Embodiments

Figure 1:
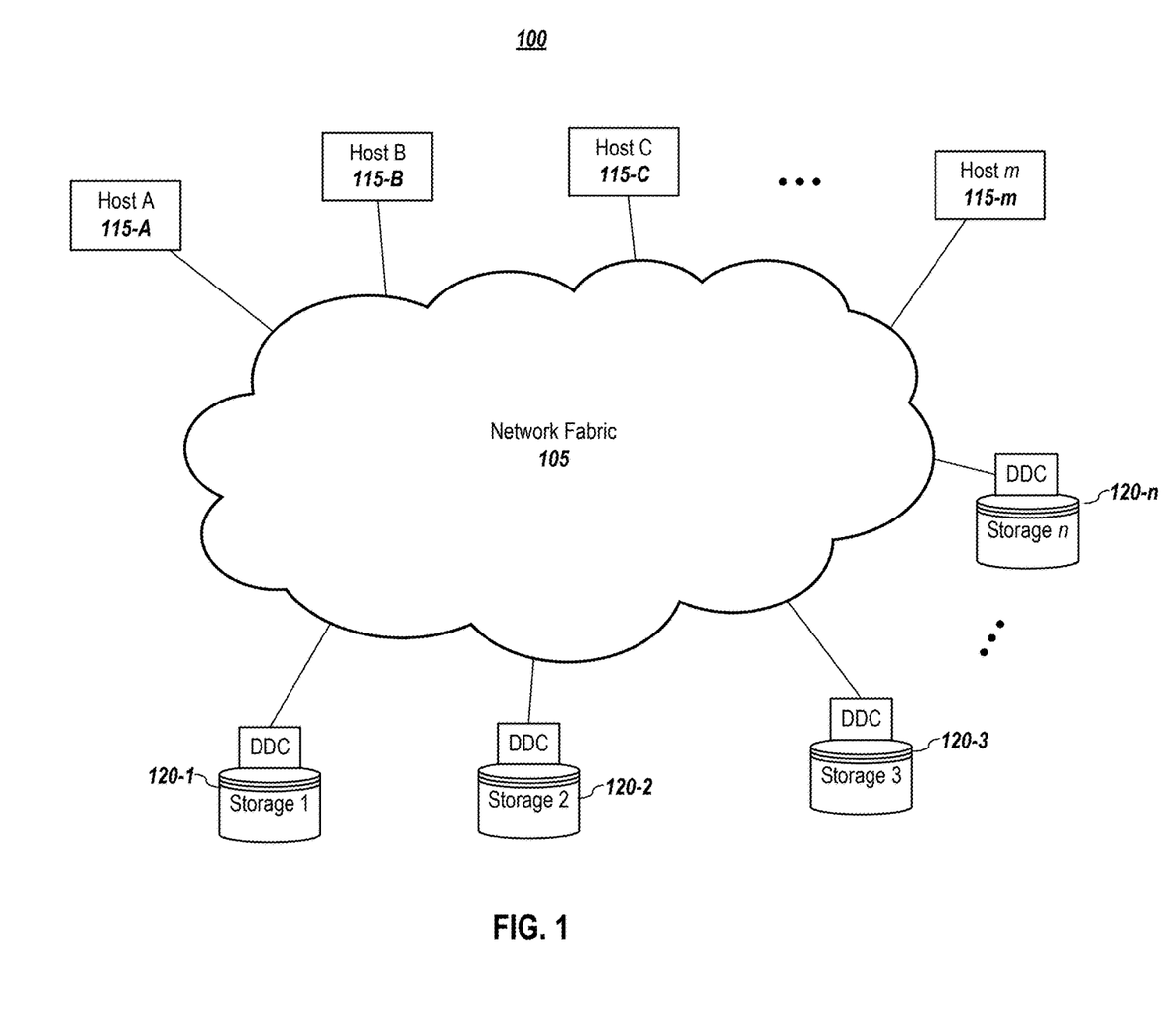
FIG. 1 ("FIG. 1") depicts a TCP/IP storage area network (SAN) environment, according to embodiments of the present disclosure.

FIG. 1 depicts a TCP/IP storage area network (SAN) environment, according to embodiments of the present disclosure. Depicted is the SAN environment 100 that includes a network fabric 105 comprising a plurality of networking information handling systems (depicted symbolically as the cloud).

In the depicted embodiment, there are a plurality of host systems, host A 115-A, through host m 115-*m*, and there is a plurality of storage subsystems (e.g., storage array 1 120-1 through storage array n 120-*n*). The host systems and the storage arrays may also be referred to as end nodes, endpoints, or endpoint systems.

In the illustrated embodiment, each storage subsystem 120 includes a direct discovery controller (DDC). In the context of NVMe, a DDC is a type of discovery controller that resides on NVMe subsystems. It allows hosts to connect directly to storage via the DDC without the need for a Centralized Discovery Controller (CDC). The DDC provides information about the subsystem interfaces for multiple subsystems, simplifying the administration process. A DDC is typically associated with a storage subsystem and describes interfaces on that subsystem. The concept of a "referral" allows a DDC to point to other discovery controllers, which can be useful in larger configurations. In a direct discovery setup, multiple hosts and subsystems can connect without a CDC in the network, which can be advantageous in smaller or more straightforward network environments. However, in larger enterprise environments, implementing a CDC can be beneficial as it supports other features, such as registration, zoning, and other features that help automate and/or simplify the discovery, configuration, and/or management processes.

Figure 2:
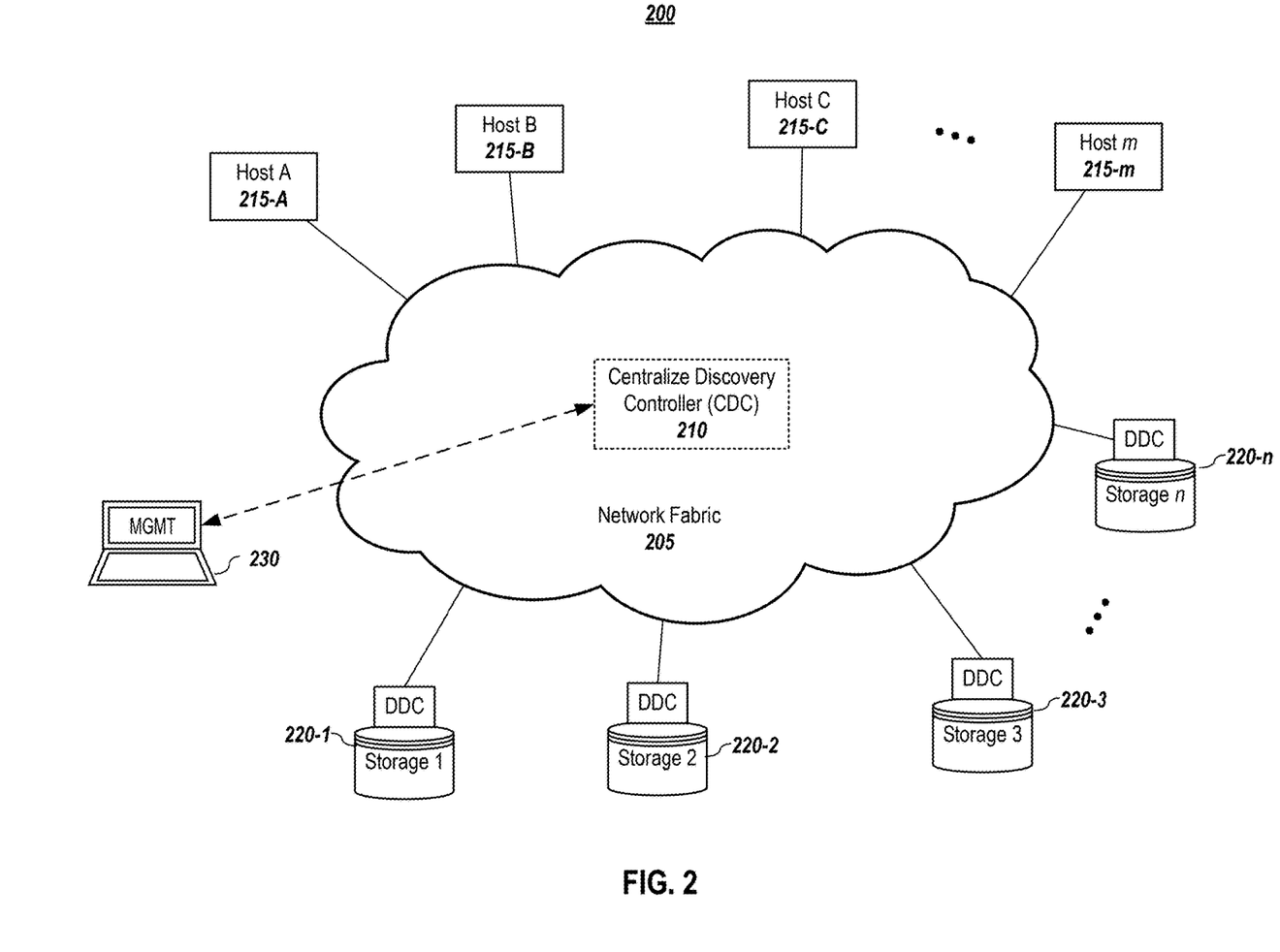
FIG. 2 depicts an alternative TCP/IP storage area network (SAN) environment, according to embodiments of the present disclosure.

FIG. 2 depicts a TCP/IP storage area network (SAN) environment, according to embodiments of the present disclosure. Depicted is the SAN environment 200 that includes a network fabric 205 comprising a plurality of networking information handling systems (not depicted) and a centralized discovery controller (CDC) 210 within the network fabric 205. The CDC 210 may operate on a single information handling system or may be distributed to a set of information handling systems. For example, in one or more embodiments, different CDC services may be distributed across different information handling systems within the fabric 205.

In the depicted embodiment there are a plurality of host systems, host A 215-A, through host m 215-*m*, and there is a plurality of storage subsystems (e.g., storage array 1 220-1 through storage array n 220-*n*). The host systems and the storage arrays may also be referred to as end nodes, endpoints, or endpoint systems. In one or more embodiments, one or more of the endpoints may be nonvolatile memory express (NVMe) entities.

In one or more embodiments, the endpoints may register with the CDC, which may be performed as part of a registration process or discovery and registration process. For example, in one or more embodiments, a push registration may involve an endpoint causing its information to be sent and registered with the CDC, and a pull registration may involve the CDC discovering and retrieving an endpoint's information. It shall be noted that a number of different discovery and registration processes may be utilized in embodiments herein.

In one or more embodiments, the CDC may maintain one or more datastores/databases of information related to the endpoints and their management. For example, zoning information may be defined in a nameserver (or zone) database (not depicted) and may be maintained by the CDC. In one or more embodiments, a zone (which may also be referred to as a zone group) is a unit of activation (i.e., a set of access control rules enforceable by the CDC). Once in a zone, the interfaces of endpoints (which may be referred to as zone members) are able to communicate with one another when the zone has been added to an active zone set of the nameserver database. Zones may be created for a number of reasons, including to increase network security, and to prevent data loss or data corruption by controlling access between devices or user groups.

In the depicted embodiment of FIG. 2, the CDC 210 is communicatively coupled to a management interface 230, which allows an administrator to access the CDC for various purposes such as configuration and management. The CDC is a discovery mechanism that an endpoint may use for various communications mechanisms and services. For example, a host may use the CDC to discover a list of nonvolatile memory (NVM) storage subsystems with namespaces that are accessible to that host. Or, for example, a subsystem may use the CDC to discover a list of NVMe enabled-hosts that are on/connected to the fabric.

In one or more embodiments, a CDC may support all the functions of a discovery controller on the storage subsystems on the fabric, along with its own discovery log that collects data about the hosts and subsystems on the fabric. Also, the CDC may act as broker for the communication between endpoints and may act as a central point for communications from endpoints, networking information handling systems, or both.

In one or more embodiments, an end node (e.g., host or storage subsystem) establishes a TCP session for some fixed duration, rather than maintaining the TCP session whether or not it is being utilized. During this fixed duration, the end node may perform some function or operation (e.g., registration of its parameters, or obtaining log page information). However, unlike prior approaches, once the operation has completed, the end node may choose to disconnect from the CDC or DDC.

To facilitate the above, in one or more embodiments, a new DIM message may be added to inform/register that it supports connection/re-connection functionality with one or more durations (e.g., an initial connection timeout (ICTO) and a rediscovery timeout (RDTO). For example, after the completion of the ICTO duration, the end node may be expected to disconnect. Once the end node disconnects, the DC (e.g., either CDC or DDC) may move the end node into a new state, which may be called an "INACTIVE" state. In one or more embodiments, the DC's database entry for this end node will otherwise remain intact for this state.

In one or more embodiments, the change of status for the end node into the "INACTIVE" state does not trigger a notification to be sent to any end node interacting or related to that end node. That is, the "INACTIVE" state is not like the end node's state moving to an "OFFLINE" state, which would trigger an exchange between the DC and affected members in the end node's zone(s). In one or more embodiments, a purge duration may also not start for the end node in "INACTIVE" state.

1. Embodiments of Disconnecting

Figure 3:
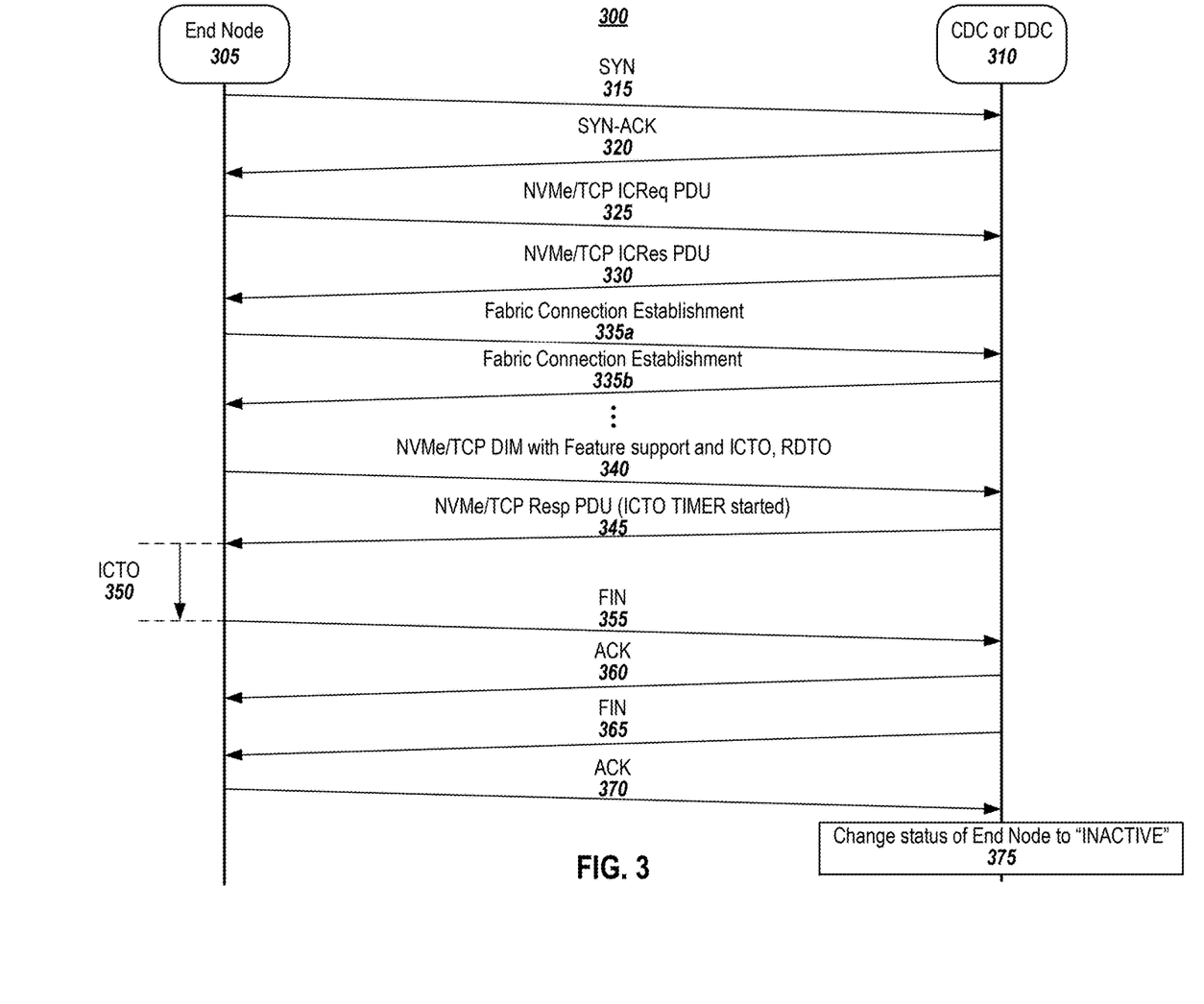
FIG. 3 depicts an initial connection and registration of an end node followed by a disconnection, according to embodiments of the present disclosure.

FIG. 3 depicts an initial connection and registration of an end node followed by a disconnection, according to embodiments of the present disclosure.

In the depicted embodiment, the end node 305 corresponds with a discovery controller 310, which may be a CDC or DDC. Steps 315 through 335 represent a typical NVMe protocol or exchange to establish a TCP connection between the end node 305 and the DC 310. For example, in one or more embodiments, a TCP connection may be established between the end node 305 and the controller 310 by having the controller set to "listen" for end node-initiated TCP connection establishment requests. The end node 305 initiates (315) the connection by sending a SYN (synchronize) flag to the DC 310, requesting synchronization of sequence numbers. The DC responds (320) with a SYN-ACK (synchronize-acknowledge) flag, acknowledging the synchronization and providing its own sequence number. The end node acknowledges the DC's sequence number with an ACK (acknowledge) flag. An ICReq PDU (Initialize Connection Request Protocol Data Unit (ICReq PDU)), which is part of the NVMe/TCP protocol, may be used during the connection setup process. When the end node initiates a connection, it constructs an ICReq PDU and sends (325) it to the DC. The ICReq PDU provides information to the DC.

When the DC receives the ICReq PDU, it responds (330) with an ICRes PDU (Initialize Connection Response Protocol Data Unit (ICRes PDU)). The ICRes PDU serves as the response from the DC 310 to the NVMe initiator 305 during the connection setup process and provides information to the end node, allowing both sides to negotiate parameters and establish a functional NVMe/TCP connection. The ICRes PDU provides important negotiation details, ensuring proper configuration and compatibility for subsequent data transfers. The TCP fabric connection is established (335).

In one or more embodiments, after or during the establishment of the TCP connection, the entities (305 and 310) negotiate parameters, including parameters specific to NVMe/TCP. The parameter negotiations may include the end node and the DC exchanging information about features, capabilities, and settings related to NVMe over TCP. They may also determine what features are supported and agree on the configuration.

In the depicted embodiment, the entities may indicate that they support features of the current patent documents, including connection disconnection. For example, in one or more embodiments, a message or messages (e.g., a new DIM message or messages) may be exchanged to inform/register (340/345) that the end point and the DC both support an inactive status disconnect functionality. In one or more embodiments, the exchange may include parameters such as expected connection duration (e.g., ICTO—an initial connection timeout) and reconnection/rediscovery duration (e.g., RDTO—a rediscovery timeout).

As illustrated in the example embodiment in FIG. 3, the initial connection timeout (ICTO) may start (350). It shall be noted that there may be one or more different triggers to start the ICTO, such as when the connection completes 335, once the end node 305 registration completes, or following successful connection with another end node (e.g., a host successfully connects to a storage subsystem). Once the ICTO duration ends, the end node 305 may terminate the connection with the DC 310, as illustrated with steps 355-370.

In one or more embodiments, once the end node disconnects, the DC 310 may move (375) the end node's status to a new state called "INACTIVE." The DC's database entry for this end node will otherwise remain intact for this state—that is, the DC does not purge the entry for this end node. In one or more embodiments, the change of status for the end node into the "INACTIVE" state does not trigger a notification to be sent to any end node interacting with or related to that end node (e.g., other end nodes that are in a same zone or zones with that end node). Note that, in one or more embodiments, the "INACTIVE" state is not the same as an "OFFLINE" state, which may trigger an exchange (e.g., an AEN) between the DC and affected members in the end node's zone(s). In one or more embodiments, a purge duration may also not start for the end node in "INACTIVE" state.

2. Embodiments of Rediscovery

Figure 4:
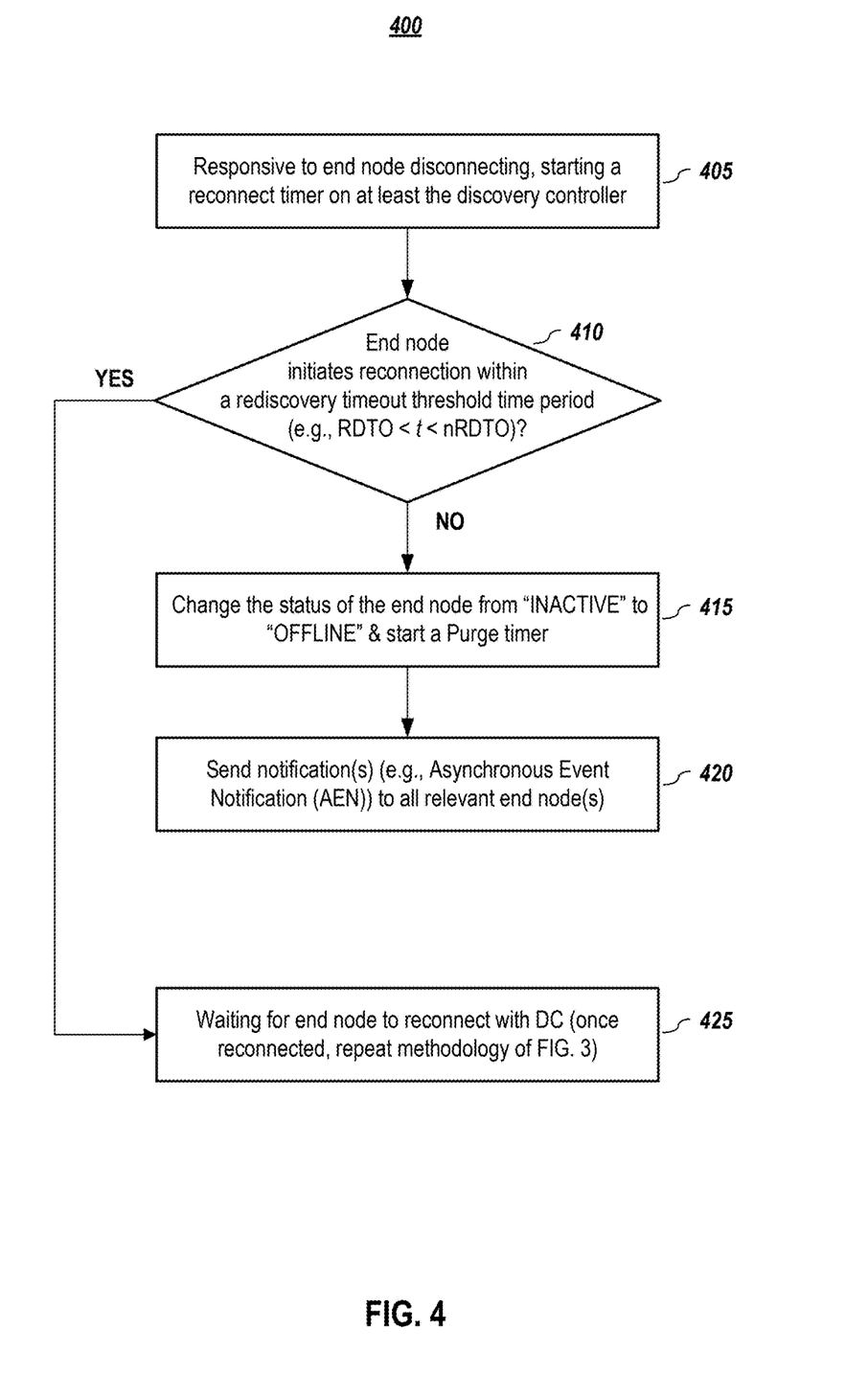
FIG. 4 depicts a methodology for rediscovery, which may be a feature of inactive status functionality, according to embodiments of the present disclosure.

FIG. 4 depicts a methodology for rediscovery, which may be a feature of inactive status functionality, according to embodiments of the present disclosure. In one or more embodiments, responsive to the end node (e.g., end node 305) disconnecting, the DC 310, the end node 305, or both may start (405) a reconnect timer. When an initial rediscovery time duration (RDTO) expires, the DC or the end node may initiate reconnection. In one or more embodiments, the RDTO duration may be longer than the ICTO duration. The rediscovery connection allows the DC and the end node to check connectivity by re-establishing a TCP connection within a rediscovery timeout threshold time period (e.g., after an initial RDTO but not longer than some upper time limit (e.g., n×RDTO)).

If the end node fails (410) to initiate reconnection within the rediscovery timeout threshold time period, the end node may be changed (415) to an offline status. In one or more embodiments, the DC may also start a purge timer to purge data about the end node if it does not successfully reconnect before a purge time duration has expired.

Due to the change of status of the end node, the DC may send (420) a notification or notifications to all relevant end nodes that may be affected by the change of status. For example, end nodes that are zone members with the offline end node may be notified of its change of status and may take appropriate action.

If the end node successfully (410) initiates reconnection within the rediscovery timeout threshold time period, the end node and the DC may follow the same or similar procedure as depicted in FIG. 3. Once the TCP connection is re-established, the DC knows that this connection is part of the rediscovery process and may keep the status as an "inactive" status because the end node will be disconnecting again. Alternatively, the end node's status may be changed to an "active" status when it reconnects with the DC, but, in one or more embodiments, this change in status (from "inactive" to "active") may be flagged not to cause any notifications to be sent to related end nodes (e.g., other end nodes that are zone members with the end node).

3. Embodiments of Changes Affecting an End Node in "Inactive Status"

Figure 5:
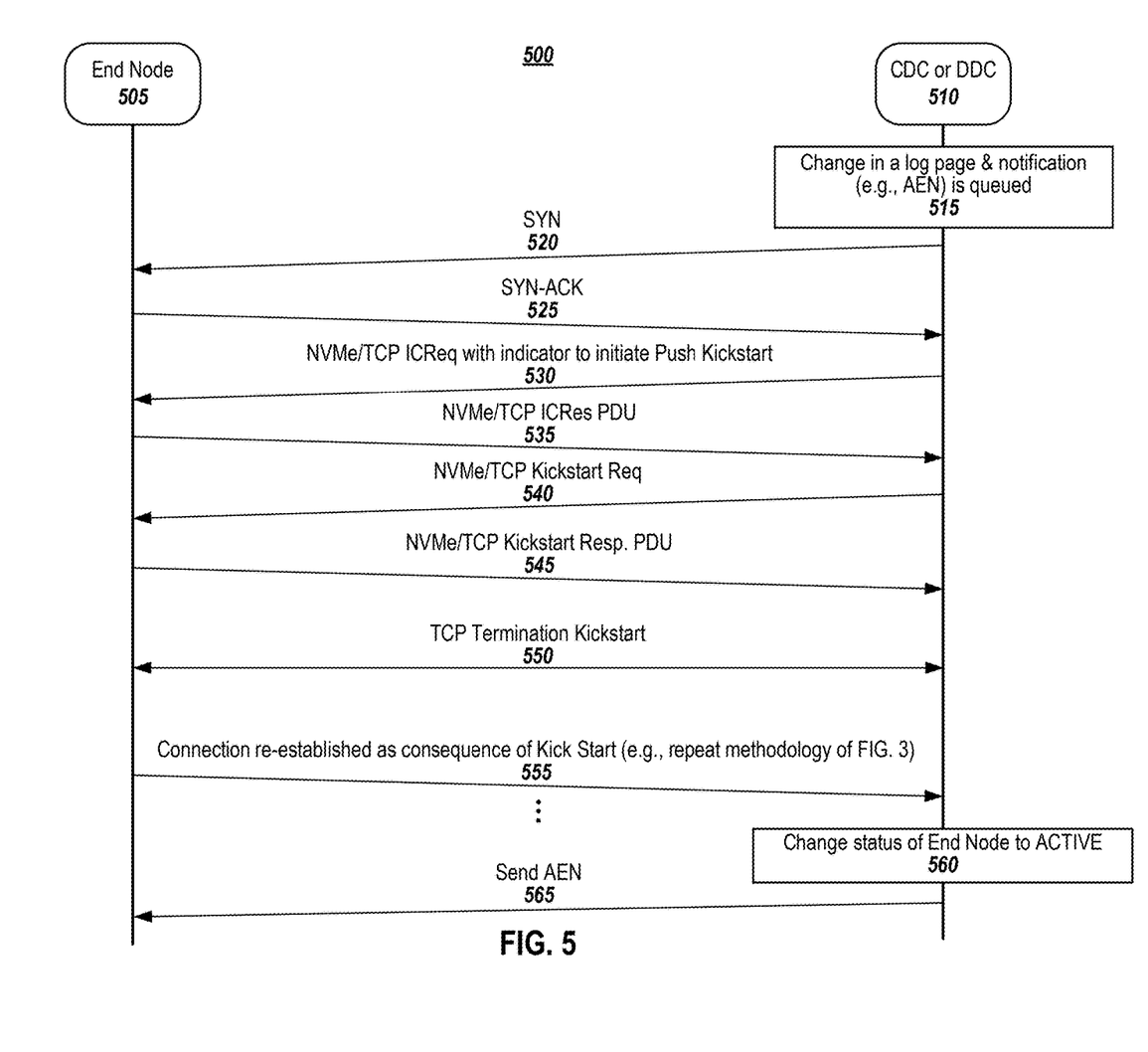
FIG. 5 depicts a methodology for handling changes that affect an end node that is in an "inactive" status, according to embodiments of the present disclosure.

FIG. 5 depicts a methodology for handling changes that affect an end node that is in an "inactive" status, according to embodiments of the present disclosure. In one or more embodiments, responsive to a change occurring that affects the end node 505 that is in an "inactive" status, the DC 510 may initiate a process to cause a connection re-establishment with the end node. As shown in FIG. 5, data in a log page or other database entry may change, which would normally cause a notification (e.g., an AEN) to be sent. If, however, the DC determines that the end node that is to receive a notification has an "INACTIVE" status, the notification may be queued (515) and a reconnection timer may be started.

A process to re-establish an explicit connection between the end node 505 and the DC 510 may be commenced. In one or more embodiments, a reconnection mechanism may be used to re-establish the connection. To help facilitate the reconnection, the end node—at least when it does not have an active connect with the DC—may be configured to listen on a reserved port for a reconnection process, such as a kickstart process.

Embodiments of kickstart and pull registration are described in co-pending and commonly-owned U.S. patent application Ser. No. 17/239,462, filed on 23 Apr. 2021, and in co-pending and commonly-owned U.S. patent application Ser. No. 17/200,896, filed on 14 Mar. 2021. Each of the aforementioned patent documents is incorporated by reference herein in its entirety.

Steps 520-550 depict example kickstart steps that may be used to trigger a TCP connection re-establishment. For example, the DC may initiate an ICReq for kickstart reconnection. In the ICReq message, a bit (e.g., the 7th bit) is set to "1" for kickstart discovery pull registration requests; in one or more embodiments, any of the reserved bit bits may be used to indicate its kickstart discovery push/reconnection request. Based on the response, the DC may initiate the kickstart request with the record having the DC's details (e.g., NON, IP address, etc.), and the end node's kickstart response will include the end node's details (e.g., HOST_NQN, IP address, etc.).

It shall be noted that at least one difference between typical kickstart requests (Step 540) and kickstart responses (Step 545) is that these steps typically flow in the other direction. Thus, in one or more embodiments, the kickstart request (540) contains DC information and the kickstart response (545) contains end node information.

In one or more embodiments, if the end node's information (e.g., its NQN) does not match during one of the steps, the end node may be moved to an "OFFLINE" state, and a new registration may be performed. In one or more embodiments, moving the state to "OFFLINE" may trigger the start of a purge timer, and if the end node with matching identifier(s) (e.g., NON, etc.) does not successfully reconnect by the expiration of the purge timer, its information may be purged (or archived).

After successful kickstart, the re-establishment of a connection between the end node 505 and the DC 510 may follow (555) the same or similar process as that depicted in FIG. 3. In one or more embodiments, once the entity has re-established a connection, the DC may change (560) the status of the end node 505 to "ACTIVE." As noted above, this change of status may be specially flagged so as not to trigger notification(s) to be sent to the end nodes.

Having reconnected, the DC sends (565) the queued notification to the end node that facilitates communicating information about the change that affects the end node. It shall be noted that a typical NVMe process may be used to communicate the changed information. For example, while not depicted in FIG. 5, the notification sent from the DC may be an AEN (response to an AER (asynchronous event request)). The end node, after receiving the AEN, may send a Get Log Page request to the DC. The DC, after receiving the Get Log Page request, responds with a Log Page response (or responses) that includes the updated/changed information that triggered the process 500 of FIG. 5.

In one or more embodiments, once all updated/changed information has been exchanged, the connection again be terminated in like manner as described with respect to FIG. 3.

Note that the above-described flow is if reconnection is successfully and timely completed. However, such may not always be the case. Accordingly, FIG. 6 depicts an alternative methodology for handling changes that affect an end node that is in an "inactive" status, according to embodiments of the present disclosure.

Figure 6:
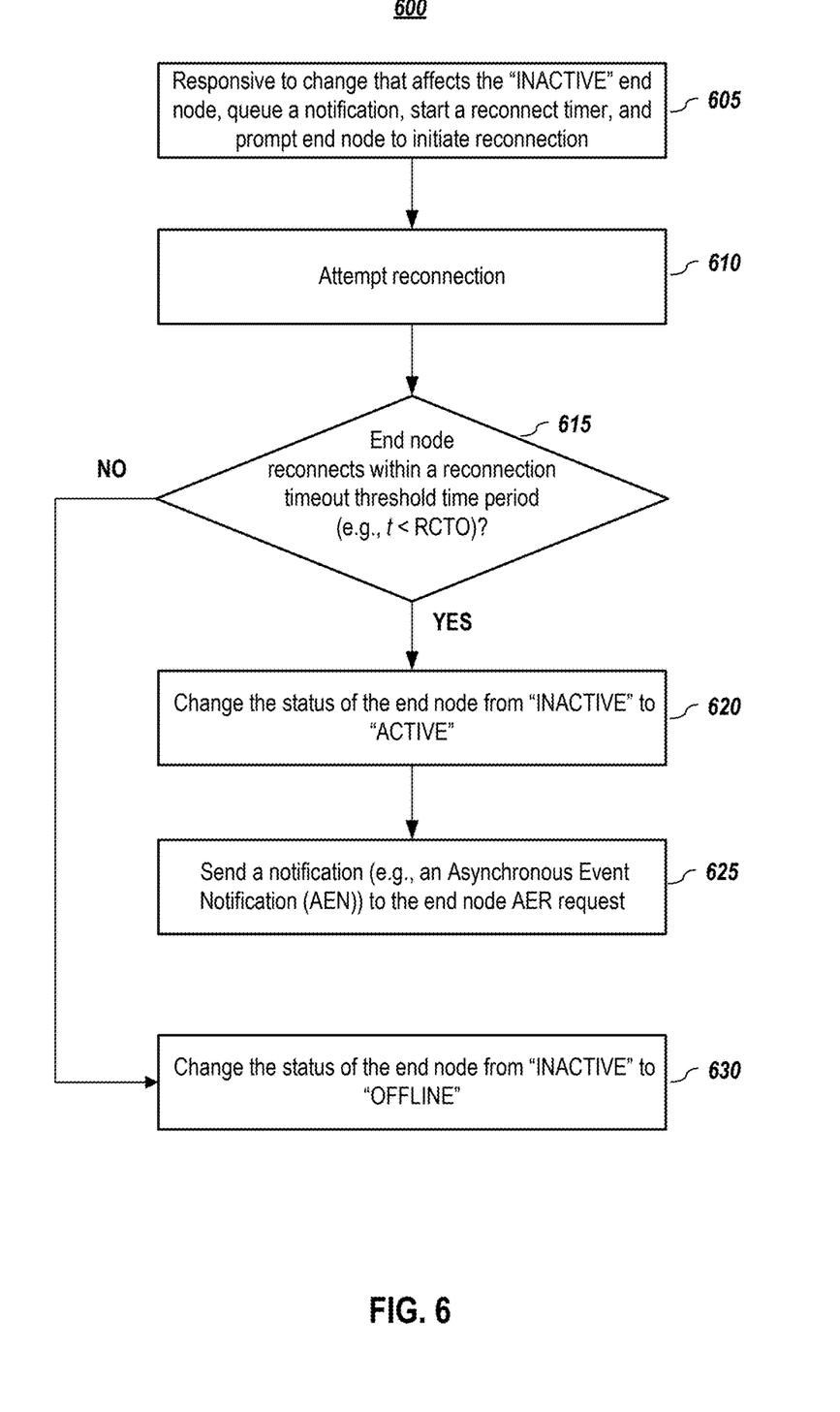
FIG. 6 depicts an alternative methodology for handling changes that affect an end node that is in an "inactive" status, according to embodiments of the present disclosure.

As illustrated in FIG. 6, responsive to a change occurring that affects an end node that is listed as being in an "INACTIVE" status, the DC may queue (605) a notification, start a reconnect timer, and prompt the end node to initiate a reconnection. In one or more embodiments, a kickstart process or other process may be used to facilitate reconnection (610).

The reconnection timer may be used to check whether reconnection is performed within a reconnection timeout threshold duration (RCTO). In one or more embodiments, one or more time periods may be set. For example, if the reconnection has started within a first RCTO duration then the DC may allow the process to continue but checks to confirm that re-establishing of a TCP connection has completed within a second RCTO duration (e.g., m×RCTO).

If a connection is not completed (615) within some RCTO duration (whether a first or second RCTO duration, depending upon embodiment), the DC may change (630) the status of the end node from "INACTIVE" to "OFFLINE." The DC may assume that there is some issue with the end node. If the end node does eventually establish a connection, its status will be updated accordingly.

In one or more embodiments, if the status is changed to "OFFLINE," a purge timer may be started. If the end node does eventually establish a connection before the purge timer expires, the end node's information may be purged or archived.

If a connection is completed (615) within some RCTO duration (whether a first or second RCTO duration, depending upon embodiment), the DC may change (620) the status of the end node from "INACTIVE" to "ACTIVE." As noted above, in one or more embodiments, this change of status may not trigger any additional notifications to be sent (e.g., no AEN(s) are sent to relevant end nodes)—especially if the end node is going to disconnect again following receiving the updated/changed information.

Once the connection has been established between the end node and the DC, a notification may be sent (625) to the end node to facilitate communication of the updated/changed information. For example, a typical NVMe AEN-Get Log Page Request-Get Log Page Response interaction may be used to communicate the information.

In one or more embodiments, following successful communication of the updated/changed information, the connection between the end node and the DC may be terminated in the same or similar manner as described above. In one or more embodiments, an additional message may be used to indicate that all information has been communicated and a connection termination process may be started.

C. Information Handling System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 7:
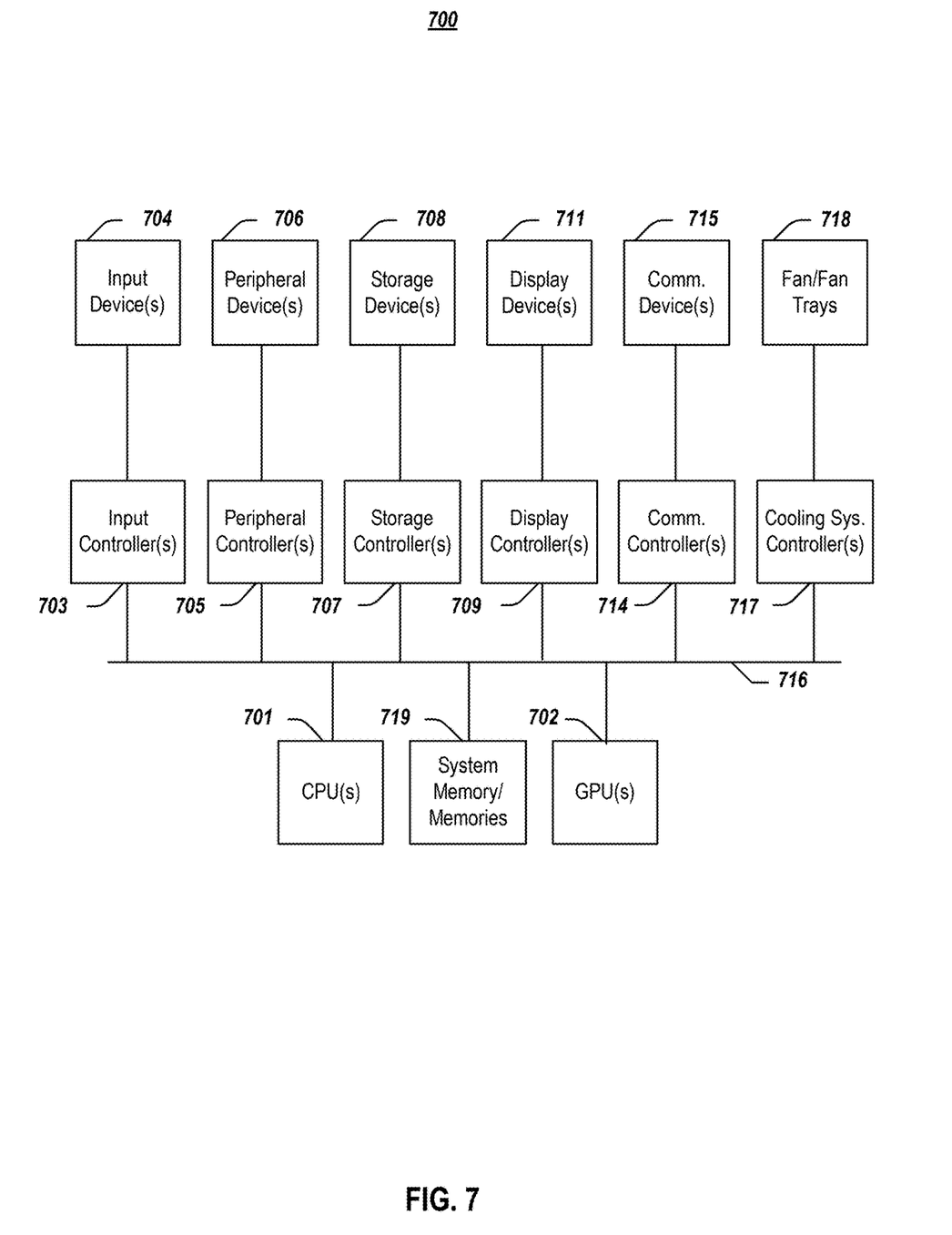
FIG. 7 depicts a simplified block diagram of an information handling system, according to embodiments of the present disclosure.

FIG. 7 depicts a simplified block diagram of an information handling system (or computing system), according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more CPUs 701 that provides computing resources and controls the computer. CPU 701 may be implemented with a microprocessor or the like and may also include one or more graphics processing units (GPU) 702 and/or a floating-point coprocessor for mathematical computations. In one or more embodiments, one or more GPUs 702 may be incorporated within the display controller 709, such as part of a graphics card or cards. In one or more embodiments, the system may alternatively or additionally include one or more data processing units (DPUs) (not shown). In the realm of data centers and cloud computing, a DPU refers to a specialized processing unit designed to accelerate data processing tasks. DPUs are typically optimized for handling data-centric workloads such as networking, storage, security, and other tasks related to data processing and manipulation. DPUs often offload specific tasks from a main CPU, allowing for improved performance, efficiency, and scalability in data-intensive applications. They may include specialized hardware components and dedicated software to efficiently process and manage data flows within a system. The system 700 may also include a system memory 719, which may comprise RAM, ROM, or both.

A number of controllers and peripheral devices may also be provided, as shown in FIG. 7. An input controller 703 represents an interface to various input device(s) 704, such as a keyboard, mouse, touchscreen, stylus, microphone, camera, trackpad, display, etc. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT) display, a thin film transistor (TFT) display, organic light-emitting diode, electroluminescent panel, plasma panel, or any other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 700 comprises one or more fans or fan trays 718 and a cooling subsystem controller or controllers 717 that monitors thermal temperature(s) of the system 700 (or components thereof) and operates the fans/fan trays 718 to help regulate the temperature.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 8:
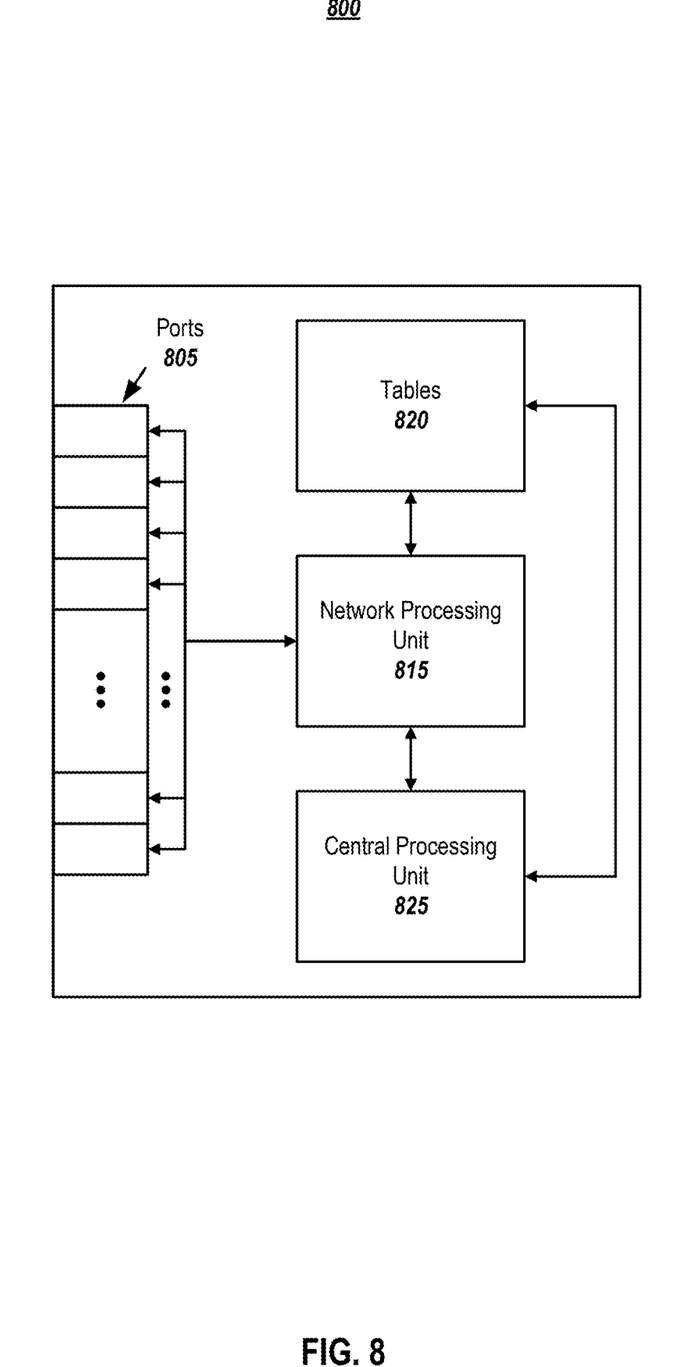
FIG. 8 depicts an alternative block diagram of an information handling system, according to embodiments of the present disclosure.

FIG. 8 depicts an alternative block diagram of an information handling system, according to embodiments of the present disclosure. It will be understood that the functionalities shown for system 800 may operate to support various embodiments of the present disclosure—although it shall be understood that such system may be differently configured and include different components, additional components, or fewer components.

The information handling system 800 may include a plurality of I/O ports 805, a network processing unit (NPU) 815, one or more tables 820, and a CPU 825. The system includes a power supply (not shown) and may also include other components, which are not shown for sake of simplicity.

In one or more embodiments, the I/O ports 805 may be connected via one or more cables to one or more other network devices or clients. The network processing unit 815 may use information included in the network data received at the node 800, as well as information stored in the tables 820, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media comprising one or more sequences of instructions, which, when executed by one or more processors or processing units, causes steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A processor-implemented method comprising:
   receiving a message from an end node that has established a connection with a discovery controller (DC), in which the message indicates that the end node supports inactive status disconnect;
   responsive to receiving the message from the end node that it supports inactive status disconnect, sending a response to the end node that the DC also supports inactive status disconnect;
   receiving from the end node a connection termination request;
   responsive to receiving from the end node the connection termination request, completing a connection termination of the connection with the end node; and
   changing a status of the end node to an "inactive" status, which does not trigger a notification to be sent to one or more other end nodes despite the status change.

2. The processor-implemented method of claim 1 wherein the discovery controller is a centralized discovery controller (CDC) or a direct discovery controller (DDC).

3. The processor-implemented method of claim 1 wherein:
   the end node starts an initial connection timeout (ICTO) timer following:
   a registration with the DC;

receipt of the response to the end node that the DC also
supports inactive status disconnect; or
connection of the end node to another end node.

4. The processor-implemented method of claim 1 further comprising:
responsive to a change that affects the end node listed in "inactive" status, triggering a connection re-establishment process with the end node; and
responsive to the end node establishing a connection with the DC, sending a notification to the end node that facilitates communicating information about the change that affects the end node to the end node.

5. The processor-implemented method of claim 4 further comprising:
responsive to the end node not reconnecting with the DC within a reconnection timeout threshold time period, changing status of the end node to an offline status.

6. The processor-implemented method of claim 5 further comprising:
responsive to the changing of the status of the end node to offline status, starting a purge timer; and
responsive to the end node not reconnecting before expiration of the purge timer, removing information about the end node from a memory managed by the DC.

7. The processor-implemented method of claim 1 further comprising:
starting a rediscovery threshold timer at or following the connection termination of the connection with the end node; and
responsive to the end node not reconnecting before expiration of a rediscovery timeout threshold duration, changing of the status of the end node to offline status.

8. The processor-implemented method of claim 1 wherein the end node is a host information handling system or a storage subsystem.

9. The processor-implemented method of claim 1 wherein the connection is a transmission control protocol (TCP) connection.

10. An information handling system comprising:
one or more processors; and
a non-transitory computer-readable medium or media comprising one or more sets of instructions which, when executed by at least one of the one or more processors, causes steps to be performed comprising:
receiving a message from an end node that has established a connection with a discovery controller (DC), in which the message indicates that the end node supports inactive status disconnect;
responsive to receiving the message from the end node that it supports inactive status disconnect, sending a response to the end node that the DC also supports inactive status disconnect;
receiving from the end node a connection termination request;
responsive to receiving from the end node the connection termination request, completing a connection termination of the connection with the end node; and
changing a status of the end node to an "inactive" status, which does not trigger a notification to be sent to one or more other end nodes despite the status change.

11. The information handling system of claim 10 wherein the discovery controller is a centralized discovery controller (CDC) or a direct discovery controller (DDC).

12. The information handling system of claim 10 wherein the non-transitory computer-readable medium or media further comprises one or more sequences of instructions which, when executed by at least one of the one or more processors, causes steps to be performed comprising:
responsive to a change that affects the end node listed in "inactive" status, triggering a connection re-establishment process with the end node; and
responsive to the end node establishing a connection with the DC, sending a notification to the end node that facilitates communicating information about the change that affects the end node to the end node.

13. The information handling system of claim 12 wherein the non-transitory computer-readable medium or media further comprises one or more sequences of instructions which, when executed by at least one of the one or more processors, causes steps to be performed comprising:
responsive to the end node not reconnecting with the DC within a reconnection timeout threshold time period, changing status of the end node to an offline status.

14. The information handling system of claim 13 wherein the non-transitory computer-readable medium or media further comprises one or more sequences of instructions which, when executed by at least one of the one or more processors, causes steps to be performed comprising:
responsive to the changing of the status of the end node to offline status, starting a purge timer; and
responsive to the end node not reconnecting before expiration of the purge timer, removing information about the end node from a memory managed by the DC.

15. The information handling system of claim 10 wherein the non-transitory computer-readable medium or media further comprises one or more sequences of instructions which, when executed by at least one of the one or more processors, causes steps to be performed comprising:
starting a rediscovery threshold timer at or following the connection termination of the connection with the end node; and
responsive to the end node not reconnecting before expiration of a rediscovery timeout threshold duration, changing of the status of the end node to offline status.

16. A non-transitory computer-readable medium or media comprising one or more sequences of instructions which, when executed by at least one processor, causes steps to be performed comprising:
receiving a message from an end node that has established a connection with a discovery controller (DC), in which the message indicates that the end node supports inactive status disconnect;
responsive to receiving the message from the end node that it supports inactive status disconnect, sending a response to the end node that the DC also supports inactive status disconnect;
receiving from the end node a connection termination request;
responsive to receiving from the end node the connection termination request, completing a connection termination of the connection with the end node; and
changing a status of the end node to an "inactive" status, which does not trigger a notification to be sent to one or more other end nodes despite the status change.

17. The non-transitory computer-readable medium or media of claim 16 further comprising one or more sequences of instructions which, when executed by at least one processor, causes steps to be performed comprising:
responsive to a change that affects the end node listed in "inactive" status, triggering a connection re-establishment process with the end node; and
responsive to the end node establishing a connection with the DC, sending a notification to the end node that facilitates communicating information about the change that affects the end node to the end node.

18. The non-transitory computer-readable medium or media of claim 17 further comprising one or more sequences of instructions which, when executed by at least one processor, causes steps to be performed comprising:

responsive to the end node not reconnecting with the DC within a reconnection timeout threshold time period, changing status of the end node to an offline status.

19. The non-transitory computer-readable medium or media of claim 18 further comprising one or more sequences of instructions which, when executed by at least one processor, causes steps to be performed comprising:

responsive to the changing of the status of the end node to offline status, starting a purge timer; and responsive to the end node not reconnecting before expiration of the purge timer, removing information about the end node from a memory managed by the DC.

20. The non-transitory computer-readable medium or media of claim 16 further comprising one or more sequences of instructions which, when executed by at least one processor, causes steps to be performed comprising:

starting a rediscovery threshold timer at or following the connection termination of the connection with the end node; and responsive to the end node not reconnecting before expiration of a rediscovery timeout threshold duration, changing of the status of the end node to offline status.

* * * * *